United States Patent Office 2,780,217
Patented Feb. 5, 1957

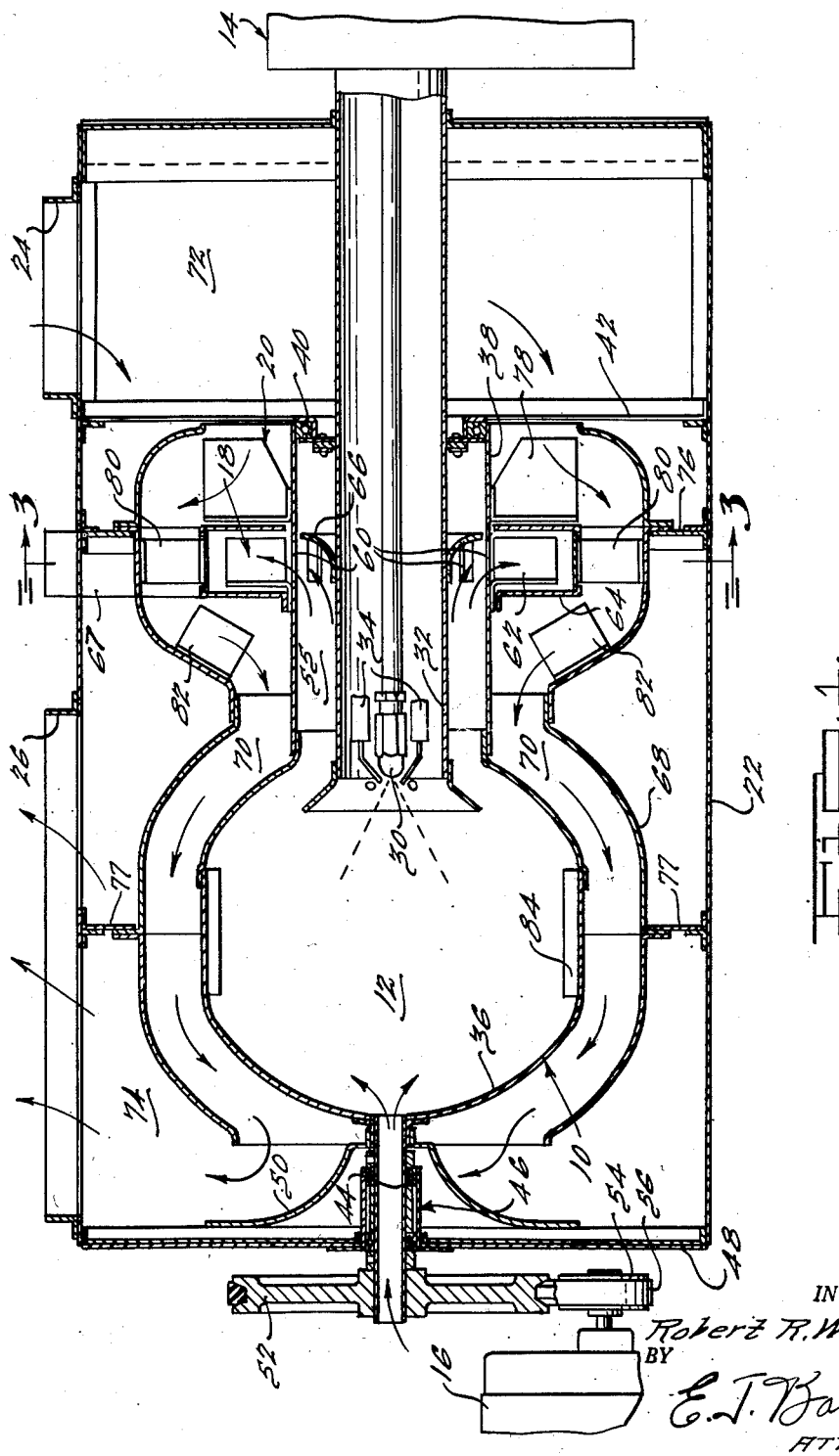

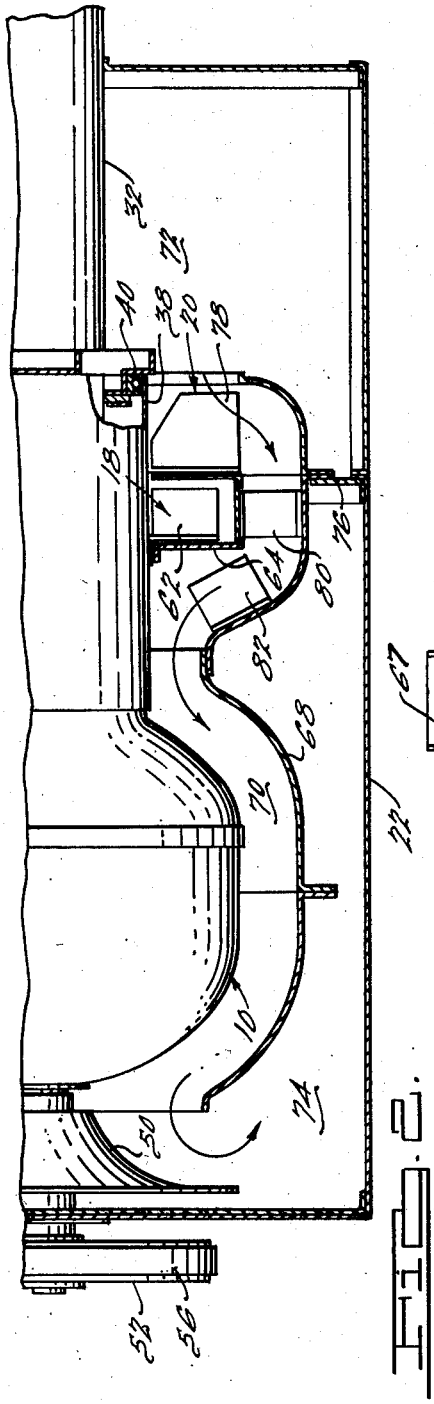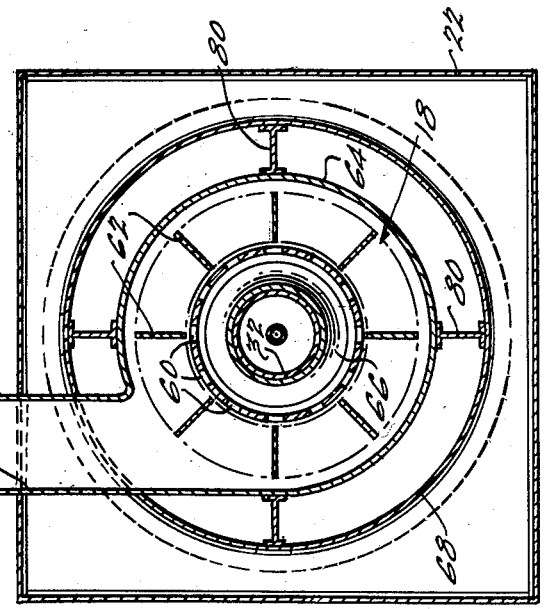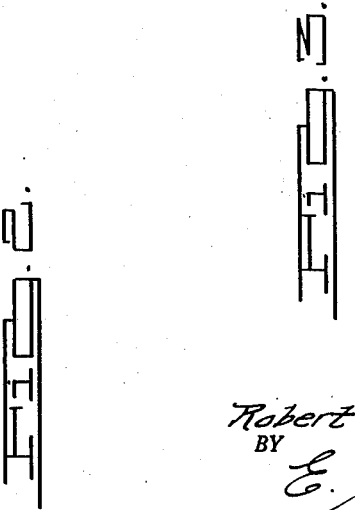
INVENTOR.
Robert R. Witherell
BY
ATTORNEY.

2,780,217

FLUID HEATING FURNACE WITH ROTARY COMBUSTION AND HEAT EXCHANGE CASING

Robert R. Witherell, Bloomington, Ill., assignor, by mesne assignments, to Eureka Williams Corporation, a corporation of New York Application June 15, 1953, Serial No. 361,680

5 Claims. (Cl. 126—110)

This invention relates to heating apparatus and in the form disclosed has particular reference to furnaces.

My invention contemplates a heating apparatus which comprises in general a rotatable hollow heat exchanger casing which forms the outer wall of a combustion chamber, the combustion changer having associated therewith fuel supply means operable for discharging a combustible fluid mixture into said chamber for combustion therein, means for rotating said casing at such a speed as to effect the flow of the products of combustion generated in said chamber in intimate heat exchange relation with the confining walls of the chamber, the outer surface of the casing being exposed to and in contact with fluid to be heated, and means rotatable with said casing for withdrawing the products of combustion therefrom after the major portion of the heat of said products of combustion has been transferred to said casing.

The rotation of the heat exchanger casing in effect greatly increases the heat transfer surface or capacity thereof and in addition substantially increases the efficiency of the heat transfer between the products of combustion and the fluid to be heated whereby it is possible by utilizing my invention to build heating apparatus of much less mass and size for a given capacity as compared with conventional apparatus.

A principal object of the invention, therefore, is to provide a new and improved heating apparatus.

Another object of the invention is to provide a new and improved furnace.

Other and further objects of the invention will be apparent from the following description and claims and may be understood by reference to the accompanying drawings, of which there are two sheets, which by way of illustration show a preferred embodiment of my invention and what I now consider to be the best mode of applying the same.

In the drawings:

Fig. 1 is a vertical sectional view of a furnace embodying the invention, certain parts being illustrated schematically;

Fig. 2 is a fragmentary sectional view with certain of the parts being shown in elevation; and Fig. 3 is a cross section taken generally along the line 3—3 of Fig. 1.

As illustrated in the embodiment of the invention selected for purposes of illustration, a heating apparatus embodying my invention comprises in general a rotary hollow heat exchanger casing 10 forming the outer walls of a combustion chamber 12, fuel supply means 14 operable for discharging a combustible fluid mixture into the chamber 12 for combustion therein, a motor 16 drivingly connected to said casing and operable for rotating the same at such a speed as to effect the flow of the products of combustion generated in the chamber 12 in intimate heat exchange relation with the walls of said casing 10, means including a suction fan 18 carried by and rotatable with the casing 10 and operable upon rotation thereof for reducing the pressure in said combustion chamber 12 so as to effect the withdrawal of the products of combustion therefrom, and means including a fan or blower 20 carried by and rotatable with the casing 10 and operable upon rotation thereof for effecting the flow of fluid to be heated in intimate heat exchange relation with the outer surface of the casing 10.

The rotary heat exchanger casing 10 is enclosed in an outer casing 22 provided with an air inlet 24 for air to be heated and an air outlet 26 for heated air. The fuel supply means 14 may comprise any conventional or suitable oil or gas burner, but preferably I contemplate employing a power operated low pressure type of oil burner according to the construction disclosed in my prior application, Serial Number 310,961, filed September 23, 1952, for Oil Burner, and assigned to the assignee of the present application. In so far as this invention is concerned, such an oil burner includes an oil and air mixing nozzle arranged adjacent the discharge end of a secondary air supply tube 32, the nozzle 30 and tube 32 being arranged to discharge into the combustion chamber 12. The nozzle 30 comprises an oil and air mixing nozzle which is constructed and arranged so as to mix oil and air supplied thereto and to discharge such mixture of oil and air in the form of a spray of air and finely divided oil particles into a stream of secondary air supplied through the tube 32 so as to form a combustible mixture therewith and such combustible mixture is discharged into the chamber 12 and is ignited by the electrodes 34 of an ignition system.

The heat exchanger casing 10 as illustrated comprises a generally spherical portion 36 and a tubular neck or portion 38. A bearing 40 carried by a frame 42 rotatably supports the neck 38. A hollow spindle 44 affixed to the spherical portion 36 is journalled in a bearing and seal assembly 46 carried by the end wall 48 of the casing. A disc-shaped baffle 50 carried by and rotatable with the spindle 44 serves as a heat shield for the bearing 46. The interior of the spindle 44 may serve as a means for introducing additional secondary air into the chamber 12 and the air so supplied will help to cool the bearing assembly 46. A pulley 52 affixed to the spindle 44 for rotation therewith is driven from the motor pulley 54 by a belt 56.

The annual passage 55 formed between the outside of the tube 32 and the inside of the neck 38 forms a discharge passage from the combustion chamber 12 for the products of combustion. The neck 38 is provided with a series of apertures 60 which communicate with the inside of the centrifugal fan 18, the blades 62 of which are affixed to the neck 38 for rotation therewith. The fan casing 64 is provided with a discharge pipe 67 which may be connected to a smoke pipe (not shown) for venting the products of combustion. A stationary deflecting baffle 66 may be arranged on the outside of the tube 32 so as to deflect the flow of the products of combustion through the apertures 60.

The heat exchanger 10 preferably is enclosed in a stationary shroud 68 which cooperates with the outer surface of the exchanger 10 to define a path 70 for the flow of air to be heated in intimate heat exchange relation with the heated surface of the casing 10. The path 70 at one end opens into the inlet chamber 72 of the furnace so as to be supplied with air therefrom and at its other end discharges into the chamber 74 which in turn communicates with the outlet 26. A partition 76 extends between the exterior of the shroud 68 and the walls of the outer casing 22 so as to separate the intake side of the furnace from the discharge side thereof. The shroud 68 is supported at one end by the partition 76 and at its other end by spaced brackets 77.

The fan 20 as illustrated comprises a series of blades 78 fixed to the neck 38 for rotation therewith and disposed adjacent the intake end of the shroud 68. Upon rotation of the casing 10 the fan 20 is operable to pump air to be heated through the passage 70 and through the ducts of the system with which the furnace may be connected. The fan casing 64 is supported by struts 80 carried by the shroud 68, the struts 80 being located in the path 70 and may be utilized as vanes to deflect the air discharged by the fan 20 along the path 70. Additional vanes 82 may also be employed for such purpose, if necesssary. Suitable sealing provisions are made between the stationary fan casing 64 and the rotating neck 38 which extends through the center thereof.

In operation the combustible mixture supplied to the chamber 12 is ignited and burned therein to generate highly heated products of combustion. The rotation of the exchanger 10 will impart a rotary motion to the combustible mixture and the flame and this serves to promote the combustion of such mixture by increasing the rate of flame propagation. In addition the rotation of the casing 10 also serves to cause the heated product of combustion to flow under the influence of centrifugal force in intimate heat exchange relation with the inner surface of the casing 10, thus creating turbulence in such products of combustion and effecting a scrubbing action between such products of combustion and the confining wallls of the casing 10. The interior of the casing 10 may be provided with a series of baffles 84, if desired, to increase this action and also to assist in directing the flow of products of combustion into the discharge passage 55. The motor 16 is arranged to rotate the casing 10 at such speed as to effect the flow of the products of combustion into intimate heat exchange relation with the confining walls of the chamber 12 and to effect the foregoing actions in the most effective manner. Naturally, the speed of rotation of the casing 10 will depend to some extent on the size of it with relation to the rate at which fuel is being burned therein and I contemplate that in a furnace of the size illustrated where the chamber 12 is approximately 12 inches in diameter, that the casing 10 would be rotated at the speed of the order of 500 R. P. M. when burning oil at the rate of ¾ of a gallon per hour. The operation of the suction fan 18 upon the rotation of the casing 10 will reduce the pressure in the combustion chamber 12 so as to expedite the withdrawal of the products of combustion therefrom. The operation of the fan 20 with the rotation of the casing 10 will serve to effect the flow of air to be heated in intimate exchange relationship with the heated walls of the casing 10 and the rotation of the casing 10 will tend to cause the air in the path 70 to rotate in a spiral path, thus effectively increasing the length of travel of the air in contact with the casing 10. In addition, the rotation of the casing 10 will effect a certain amount of turbulence of the air in the path 70 and a good wiping action between the air in the path 70 and the casing 10 so as to increase the dissipation of heat from the casing 10. It will further be noted that the secondary air supplied under pressure through the tube 32 flows in heat exchange relation with the products of combustion in the path 55 which will have the effect of increasing the efficiency of combustion of the fuel in the chamber 12.

While I have illustrated and described a preferrred embodiment of my invention, it is understood that this is capable of modification and I therefore do not wish to be limited to the precise details set forth but desire to avail myself of such changes and alterations as fall within the purview of the following claims.

I claim:

1. Heating apparatus comprising a rotatable hollow heat exchanger casing having a portion forming a combustion chamber and an elongated neck portion communicating therewith, fuel and air supply means projecting into said casing through said neck portion and operable to discharge a combustible mixture of fuel and air into said combustion chamber, means for rotating said casing about the axis of said neck portion at such speed as to bring the products of combustion of said mixture into intimate heat exchange relation with the walls of said heat exchanger, said neck portion having means for the discharge of products of combustion from said combustion chamber, means carried by and rotatable with said casing and operable upon rotation thereof for effecting the flow of said products of combustion from said chamber through said neck portion and said discharge means, and means for effecting the flow of fluid to be heated in heat exchange relation with the outer surface of said casing.

2. Heating apparatus according to claim 1 wherein said supply means includes an air supply tube disposed within said neck portion of said casing and adapted to supply air for combustion in heat exchange relation with the products of combustion being discharged from said neck portion.

3. Heating apparatus according to claim 1 wherein said means to effect the flow of fluid to be heated comprises a blower mounted on the exterior of said casing for rotation therewith.

4. Heating apparatus comprising an elongated rotatable hollow heat exchanger casing of circular cross-section forming a combustion chamber, fuel and air supply means including an air supply tube projecting into said casing in spaced relation therewith through one end thereof and operable to discharge a combustible mixture of fuel and air into said combustion chamber, bearing means rotatably supporting said one end of said casing, means drivingly connected to the other end of said casing for rotating said casing about its axis to bring the products of combustion of said mixture into intimate heat exchange relation with the inner surface of said casing, said one end of said casing having means for the discharge of products of combustion from said combustion chamber, means carried by and rotatable with said casing and operable upon rotation thereof for effecting the flow of said products of combustion from said chamber through said discharge means, said air supply tube projecting inwardly of said casing beyond said discharge means whereby air for combustion is supplied by said tube in heat exchange relation with said products of combustion, a shroud surrounding said casing in spaced relation and defining an annular path therewith for the flow of fluid to be heated, and means carried by and rotatable with said casing and operable upon rotation thereof for effecting the flow of fluid to be heated through said path in heat exchange relation with the outer surface of said casing.

5. Heating apparatus comprising a rotatable hollow heat exchanger casing forming the outer walls of a combustion chamber, said casing having a substantially spherical portion and an elongated neck portion communicating therewith, fuel and air supply means projecting into said casing through said neck portion and operable to discharge a combustible mixture of fuel and air into said combustion chamber, means for rotating said casing about the axis of said neck portion at such speed as to bring the products of combustion of said mixture into intimate heat exchange relation with the walls of said heat exchanger, said neck portion having means for the discharge of products of combustion from said combustion chamber, means carried by and rotatable with said casing and operable upon rotation thereof for effecting the flow of said products of combustion from said chamber through said discharge means, a shroud surrounding said casing in spaced relation and defining an annular path therewith for the flow of fluid to be heated, and means carried by and rotatable with said casing and operable upon rotation thereof for effecting the flow to be heated through said path in heat exchange relation with the outer surface of said casing.

(References on following page)

References Cited in the file of this patent

UNITED STATES PATENTS

| | | |
|---|---|---|
| 1,895,565 | Bell | Jan. 31, 1933 |
| 2,263,998 | McCollum | Nov. 25, 1941 |
| 2,354,345 | Wintergreen | July 25, 1944 |
| 2,414,829 | McCollum | Jan. 28, 194? |
| 2,414,830 | McCollum | Jan. 28, 194? |
| 2,495,311 | Beaver | Jan. 24, 195? |
| 2,582,066 | Resek | Jan. 8, 195? |
| 2,590,109 | Lindenbaum | Mar. 25, 195? |